(12) United States Patent
Coyle

(10) Patent No.: US 6,502,051 B1
(45) Date of Patent: Dec. 31, 2002

(54) METHOD AND APPARATUS FOR OPTIMIZING TESTING SEQUENCES FOR ELECTRONIC EQUIPMENT

(75) Inventor: Joseph P. Coyle, Leominster, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/526,677

(22) Filed: Mar. 16, 2000

(51) Int. Cl.[7] .............................................. G06F 11/263
(52) U.S. Cl. ...................... 702/123; 702/120; 702/121; 714/738
(58) Field of Search ........................ 702/108, 117–121, 702/123–125, 177, 182–187, FOR 103, FOR 104, FOR 134, FOR 135, FOR 157, FOR 170, FOR 171; 324/73.1, 765; 365/201; 700/121; 714/30–32, 718, 724, 726–729, 738, 739, FOR 100, FOR 101

(56) References Cited

U.S. PATENT DOCUMENTS

| | | | | |
|---|---|---|---|---|
| 5,909,452 A | * | 6/1999 | Angelotti ..................... | 714/726 |
| 5,951,705 A | * | 9/1999 | Arkin et al. .................. | 714/32 |
| 5,983,381 A | * | 11/1999 | Chakradhar et al. ......... | 714/720 |
| 5,987,636 A | * | 11/1999 | Bommu et al. .............. | 714/720 |
| 6,029,262 A | * | 2/2000 | Medd et al. ................. | 714/724 |
| 6,119,253 A | * | 9/2000 | Kim et al. ................... | 324/763 |
| 6,128,757 A | * | 10/2000 | Yousuf et al. ............... | 714/724 |
| 6,154,714 A | * | 11/2000 | Lepejian ..................... | 700/121 |
| 6,311,301 B1 | * | 10/2001 | Posse et al. ................. | 714/724 |
| 6,363,510 B1 | * | 3/2002 | Rhodes et al. ........... | 324/158.1 |

* cited by examiner

*Primary Examiner*—Hal Wachsman
(74) *Attorney, Agent, or Firm*—Kudirka & Jobse, LLP

(57) ABSTRACT

Testing of an electronic system is optimized by using a single set of sub-tests and varying the testing sequence to produce tests tailored for different purposes such as screening and diagnostic testing. For example, a programmable test sequencer in the electronic system responds to a test selection variable by using a first sequence of the sub-tests to optimize the testing process for screening and a second sequence of the sub-tests to optimize the testing process for diagnostic testing. In the diagnostic mode, the sub-tests are run so that each sub-test builds upon the previous sub-tests and uses previously-tested hardware to verify additional hardware. In the screening mode, the sub-tests are the same, but the execution order of the sub-tests is reversed so that more complex hardware is tested first as a screening mechanism.

36 Claims, 5 Drawing Sheets

METHOD AND APPARATUS FOR OPTIMIZING TESTING SEQUENCES FOR ELECTRONIC EQUIPMENT

FIELD OF THE INVENTION

This invention relates generally to the detection and diagnosis of system failures, and, more particularly, to the optimization of a test sequence for the separate goals of failure screening and failure diagnosis.

BACKGROUND OF THE INVENTION

An electronic system as used herein can take the form of a workstation, server, personal computer, an appliance or, broadly speaking, any other electronic equipment that incorporates a digital processing device or a programmable controller. Such systems generally include at least one central processing unit (CPU) that is used to execute software or firmware instructions to perform various functions. The CPU communicates with other devices in the computer system through an interconnection subsystem, commonly called a "bus." For example, a bus can interconnect the CPU, directly or indirectly, to other devices, such as chip sets, graphic adapters, memory devices, and input/output ("I/O") devices, such as keyboards, monitors, scanners and printers. In the case of a programmable controlled the bus can connect the controller to the devices which it controls, such as relays, solenoids and actuators.

Conventionally, defects and errors in such computer systems are identified and isolated by running testing software on the system. System testing software has three similar but separate goals: screening, diagnosis and verification. Screening software is run during the manufacturing process and conducts a set of tests or sub-tests in a predetermined sequence in order to identify hardware defects which can be corrected before the product is shipped to the user. When a problem is detected, it is not usually repaired on the spot; instead, the defective unit is sent to a repair depot for correction of the detected problem. Consequently, the most important feature of such software is the ability to quickly screen each system. The average screening time can be lowered by finding and reporting the first error as quickly as possible. Consequently, screening tests are arranged so that sub-tests during which a failure is most likely to occur are run first in order to identify defective systems as soon as possible.

Diagnostic software is used to identify failures and provide a test technician with information necessary to isolate and repair a problem. This software may be used to detect a board that causes a failure during manufacturing and the repair might be at the component or etch level. The important feature of this software is the ability to isolate a problem and to provide enough debug information concerning the problem to enable a test technician to determine what has caused the failure so that the system can be repaired. Diagnostic software also consists of a set of sub-tests that are run in a predetermined sequence, but the optimal sequence of these tests differs from the test sequence used in screening software. In diagnostic testing, the sub-tests are run initially to test small portions of the hardware. The test coverage is then gradually increased until the entire system is tested. The test sequence is designed to isolate errors at the lowest level possible so that the cause of the errors is most easily understood.

Verification software is used to determine if a system is either defective or good. The most important feature of this software is not the diagnostic information or the speed of the test, but rather the coverage. Verification software is designed to detect all defects so that if a system passes this test, the system should be good.

Two approaches are currently used to combine these three functions. In the first approach, one test program is written to serve all three purposes. By definition, it is a diagnostic program because the program has to isolate errors. In order to do this it must test from the "bottom up" —initially testing small portions of the hardware and then gradually increasing coverage until the entire system is tested. Since the program must quickly isolate the first error, each item must be tested before using it as part of another test. This approach provides good isolation, but errors can occur any time in the test. Consequently, the average screening time is extended.

In the second approach, two testing programs are used, one for diagnosis as above and another for the screening. The screening test exercises the whole system as quickly as possible. If the two tests are separate programs, an attempt is made to insure that they attain total system coverage. Since there are two tests they are more expensive to develop. In addition, designing a screening test to have total coverage is as difficult as writing a diagnostic test and lack of coverage minimizes the usefulness of the test. Diagnostic tests can be designed to perform screening, but generally at the expense of time, a major screening goal. Often both tests are written and run as needed for applications. This is a compromise that ends up running both tests for total coverage and system verification.

It would be desirable to optimize the overall testing process both during screening and diagnostic testing by reducing the time to perform the testing as much as possible without sacrificing the debugging information necessary to perform repairs.

SUMMARY OF THE INVENTION

In accordance with one illustrative embodiment of the invention, testing is optimized by using the same set of sub-tests and varying the testing sequence to optimize performance for different purposes, such as screening and diagnostic testing. In particular, with one embodiment, in the diagnostic mode, the sub-tests are run so that each sub-test builds upon the previous sub-tests and uses previously-tested hardware to verify additional hardware. In the screening mode, the sub-tests are the same, but the execution order of the sub-tests is reversed so that more complex hardware is tested first as a screening mechanism.

In accordance with one embodiment, a programmable test sequencer in the electronic system responds to a test selection variable by using a first sequence of the sub-tests to optimize the testing process for screening and a second sequence of the sub-tests to optimize the testing process for diagnostic testing.

In another embodiment, the test selection variable is a value stored in a non-volatile memory in the electronic system. In another embodiment, a test selector responds to a test selection variable by selecting one of several separate test sequencers.

In accordance with yet another embodiment, the test selection variable is a "mode" pin located on the system hardware which can be manipulated, for example, by connecting the pin to ground potential or power potential in order to change the testing sequence.

In accordance with yet another embodiment, two different test sequencers are provided, one of which is enabled in response to the test selection variable.

In still another embodiment, several different test sequences can be used to optimize testing for several different circumstances.

BRIEF DESCRIPTION OF THE DRAWINGS

The above and further advantages of the invention may be better understood by referring to the following description in conjunction with the accompanying drawings in which.

DETAILED DESCRIPTION

Figure 1:
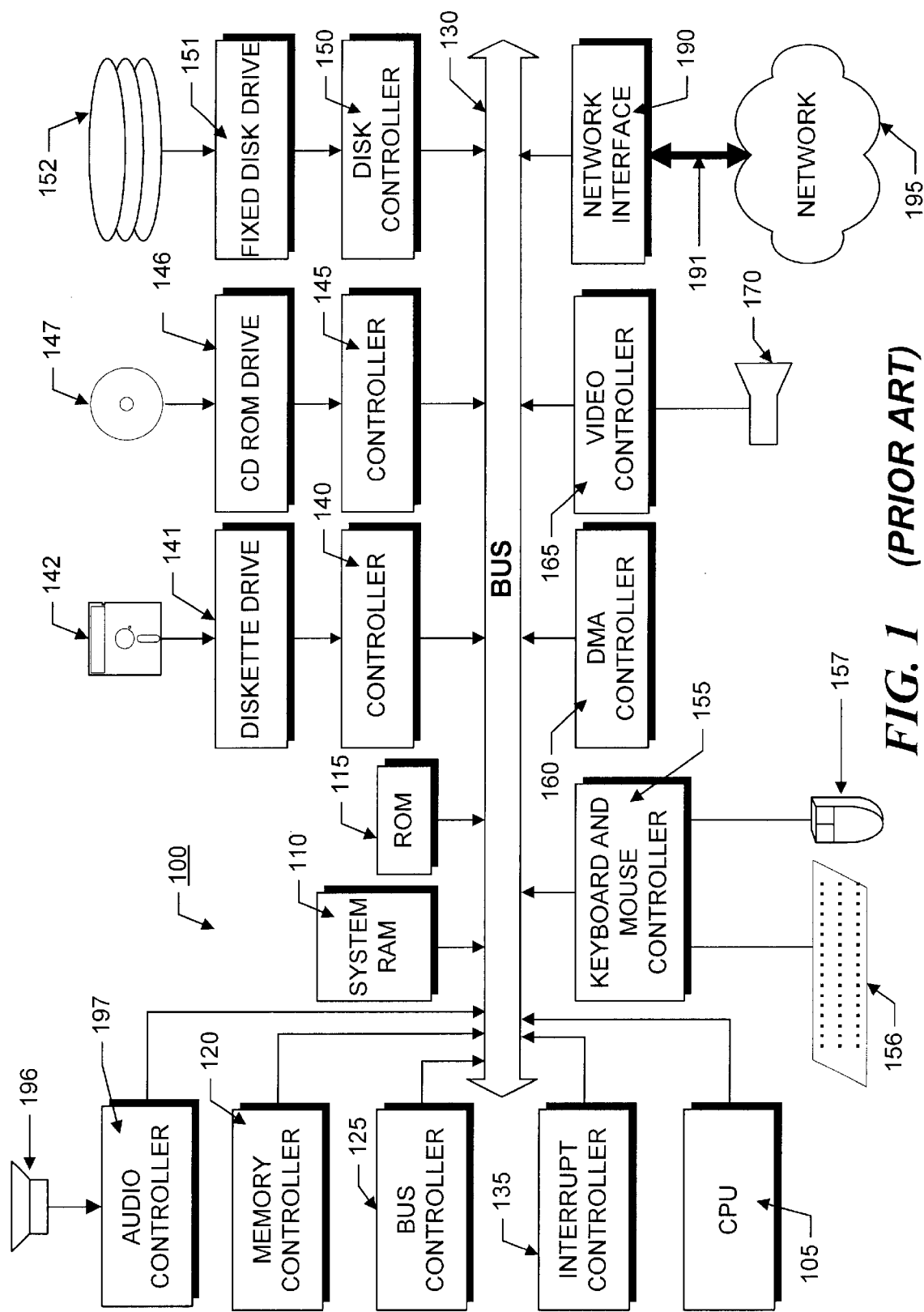
FIG. 1 is a schematic block diagram of a prior art hardware platform that forms part of a computer system on which the invention can be run.

FIG. 1 illustrates the system architecture for an exemplary client computer 100, such as a Sun Microsystems SPARC-Station computer, which can be tested using the inventive testing system. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general-purpuose communication lines that interconnect multiple network devices.

Client computer system 100 generally is controlled and coordinated by operating system software, such as the Solaris operating system (available from Sun Microsystems, Inc., Palo Alto, Calif.) or the WINDOWS 95® operating system (available from Microsoft Corp., Redmond, Wa.). Among other computer system control functions, the operating system controls allocation of system resources and performs tasks such as process scheduling, memory management, networking and I/O services.

Figure 2:
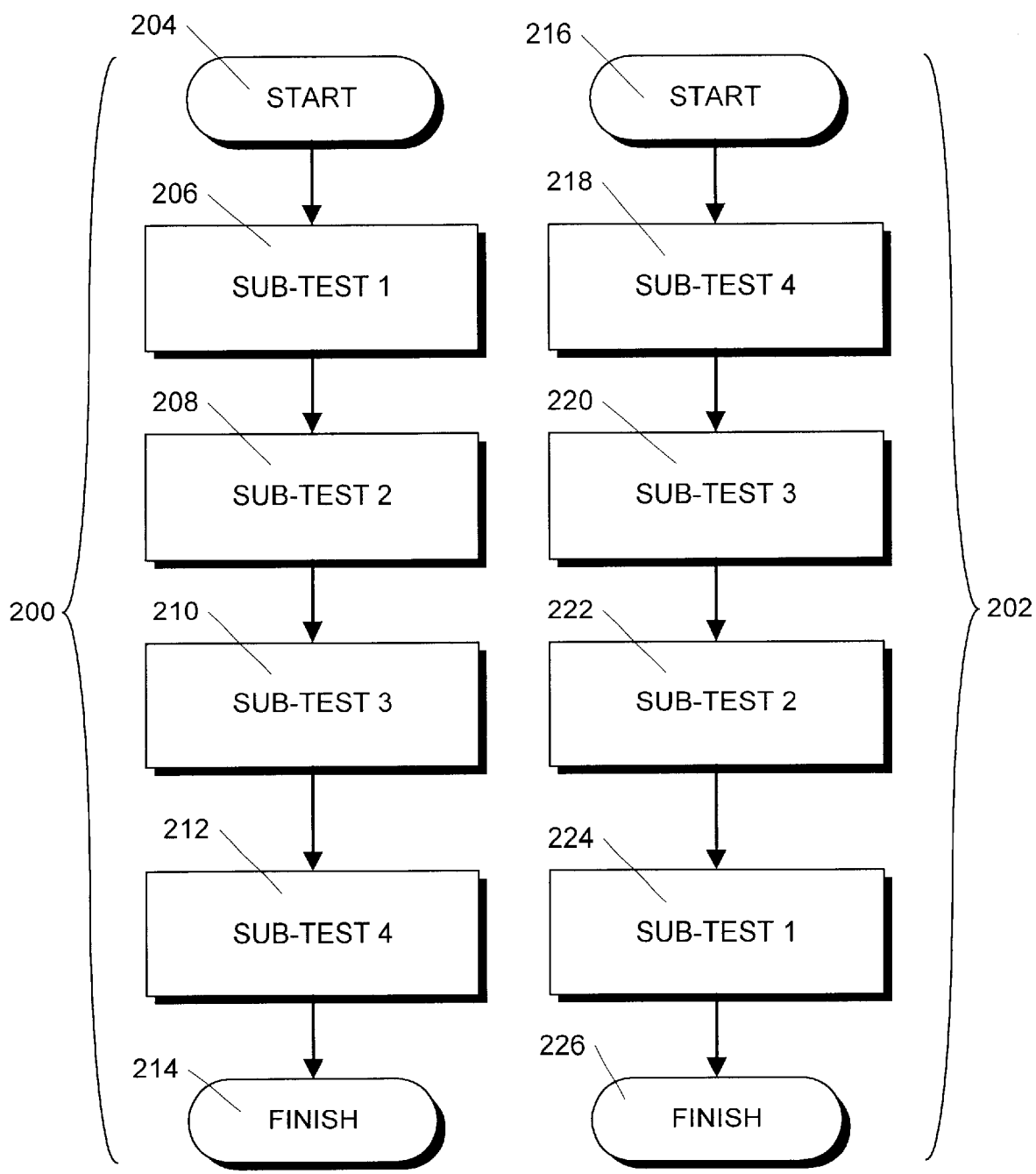
FIG. 2 is a diagram of two flowcharts that illustrate a manufacturing screening test sequence and a diagnostic test sequence and show that the sub-tests are run in a first order and then in a second order reverse from the first order.

FIG. 2 illustrates two different types of test sequences that can be conducted on a single electronic system. These might consist, for example, of a hardware screening test 200 and a diagnostic test 202. Illustratively, each of the tests consists of four sub-tests that are conducted in a predetermined sequence by tester software or circuitry located in the electronic system. Those skilled in the art would understand that more or less sub-tests could be run without departing from the spirit and scope of the invention. As previously mentioned, this predetermined sequence differs between the screening test and the diagnostic test. As shown in FIG. 2, in particular, screening test 200 starts in step 204 and conducts four sub-tests 206–212 in the order of sub-test 1, sub-test 2, sub-test 3 and sub-test 4 and finishes in step 214. In general, during a screening test, the hardest, most likely to fail tests will be run first. However, the test order may be slightly modified when one test result is dependent on a previous test result. For example, cache lines or memory may have to be cleared prior to running a particular test, but a previous test may leave the memory initialized with particular values.

The sub-test order selected for screening test 200 provides a test that minimizes the time required to identify defective boards and thereby minimizes the overall screening time. However, if each sub-test is passed, the sequence selected for the screening test runs the next sub-test so that, if the board is good, all sub-tests are run, thereby providing good test coverage.

In a preferred embodiment, the same sub-tests are run for the diagnostic test 202, but in a sequence different than the sequence used for the screening test 200. For example, diagnostic test routine 202 might perform the same four subtests used in the screening routine 200, but in the reverse order. In particular, the routine starts in step 216 and sub-tests 218–224 are performed in the order sub-test 4, sub-test 3, sub-test 2 and sub-test 1. The test then finishes in step 226. The diagnostic test is designed and sequenced in a conventional manner and tests small portions of the hardware first and then works up to the full system. It is designed to aid in the debug of problems and to isolate the errors at the earliest possible time and at the lowest system level so that the errors can be understood and eliminated. Although the diagnostic test 202 is shown running the four subtests in the opposite order from the manufacturing screening test 200, other orders would be possible and known to those skilled in the art. Running the tests in the reverse order allows the tests to start with basic hardware sub-systems and to sequentially test more complex hardware using hardware that has already tested good in previous sub-tests. In this manner each sub-test builds upon the results of previous sub-tests.

As an example, tests could be designed to test a subset of the devices that comprise the computer system of FIG. 1. This subset includes the CPU 105, the system RAM 110, the ROM memory 115, the memory controller 120 and the bus 130. The first operation performed would be to access the ROM 115 from the CPU 105. This operation is necessary to get the test program to run. Assume that the test program is tailored for diagnostic testing. After the test program has been started, the following tests would be run:
1. Basic CPU fetch tests
2. Basic CPU instruction tests
3. ROM checksum test
4. CPU internal instruction cache tests
5. CPU internal data cache tests
6. CPU error generation and detection tests The above tests would insure the correct operation of the CPU chip and basic interconnect. Similar testing Would then be performed on the other system components. This testing might include the following tests:
7. Basic system interconnection (JTAG scan)
8. Basic memory controller test.
9. Memory controller data lines test
10. Memory controller address lines test
11. Memory controller parity test
12. Memory controller error detect/correct test
13. Memory data bank (system RAM) test Similar breakdowns in the other areas would then be performed until the full system is tested. After the initial CPU to ROM interaction, every test would be aimed at one area and use previously tested hardware to perform the test. This insures the first error message points to the cause of the error and provides good isolation of any errors detected.

For a screening or verification test, the above sub tests can be run in the order 13 through 1. The reversal of the order would require that all tests do not depend on state left over from earlier tests. In this test order the most complex, and most likely to fail, test would be run first. This would insure quickest possible error catching for screening. Both test sequences would have the same coverage because they are the same tests. Just the order has changed.

The advantages of the preferred embodiment in which the same subtests are used for both the manufacturing screening tests and diagnostic tests include the advantage that the same test code can be utilized for the sub-tests thereby reducing development costs. In addition, the test coverage between the two tests is identical, but the test speed is optimized for each usage. Coverage would be maximized and both directions can act as a verification tool.

Figure 3:
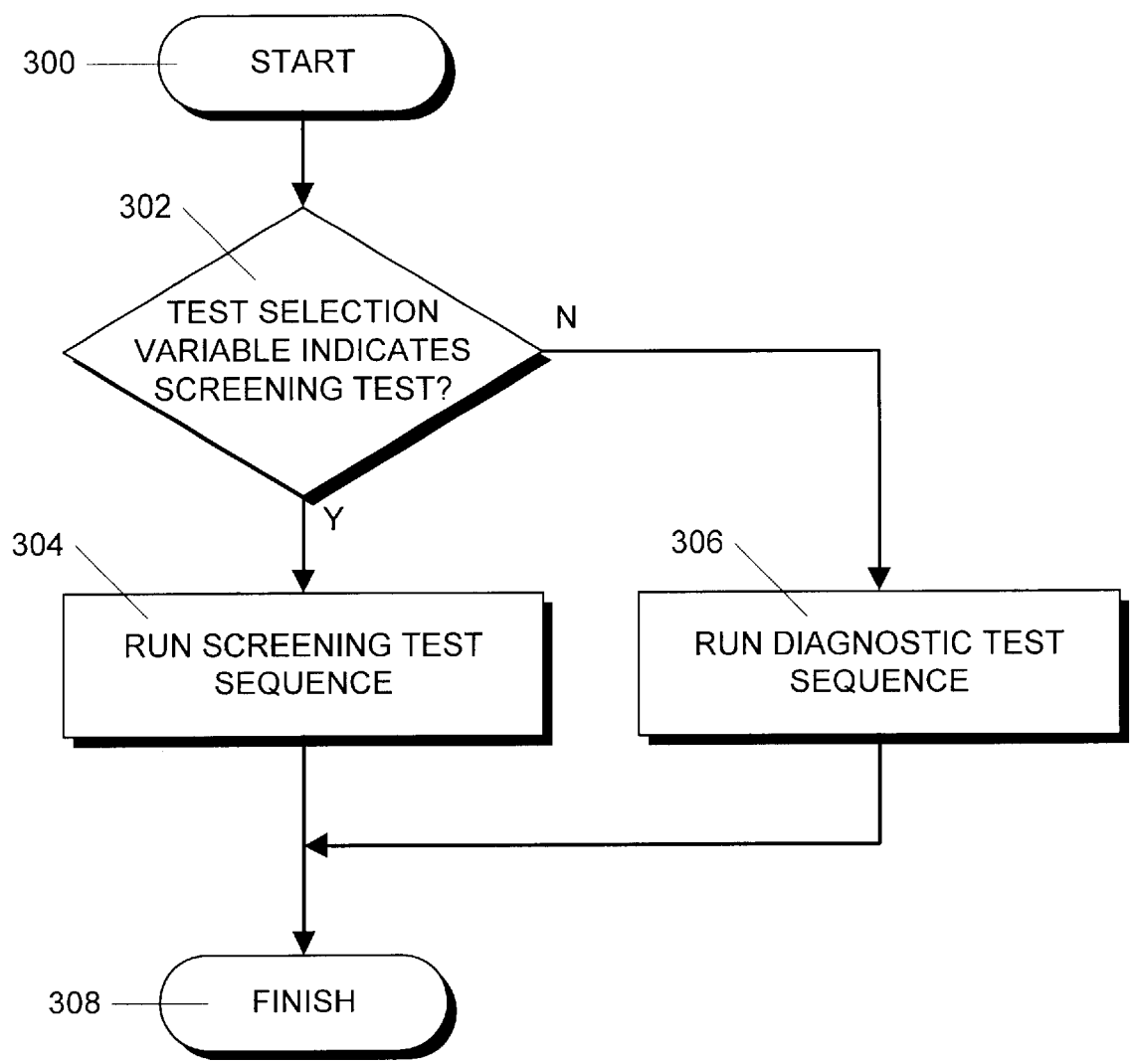
FIG. 3 is a flowchart illustrating the process of switching between screening and diagnostic test sequences.

In accordance with another preferred embodiment of the invention, a test selection variable determines which test sequence is run. By changing the test selection variable, it is possible to use the same testing system to run one sub-test sequence during screening and a separate sub-test sequence for diagnostic testing. This process is illustrated in FIG. 3. In particular, the process starts in step 300 and, in step 302, a test selection variable is examined. If the value of the test selection variable indicates that a screening test is to be performed, then the screening test sequence is run in step 304. However, if, in step 302, the test selection variable indicates a diagnostic test sequence is to be run, then the diagnostic test sequence is run in step 306. In either case, the process finishes in step 308.

Figure 4:
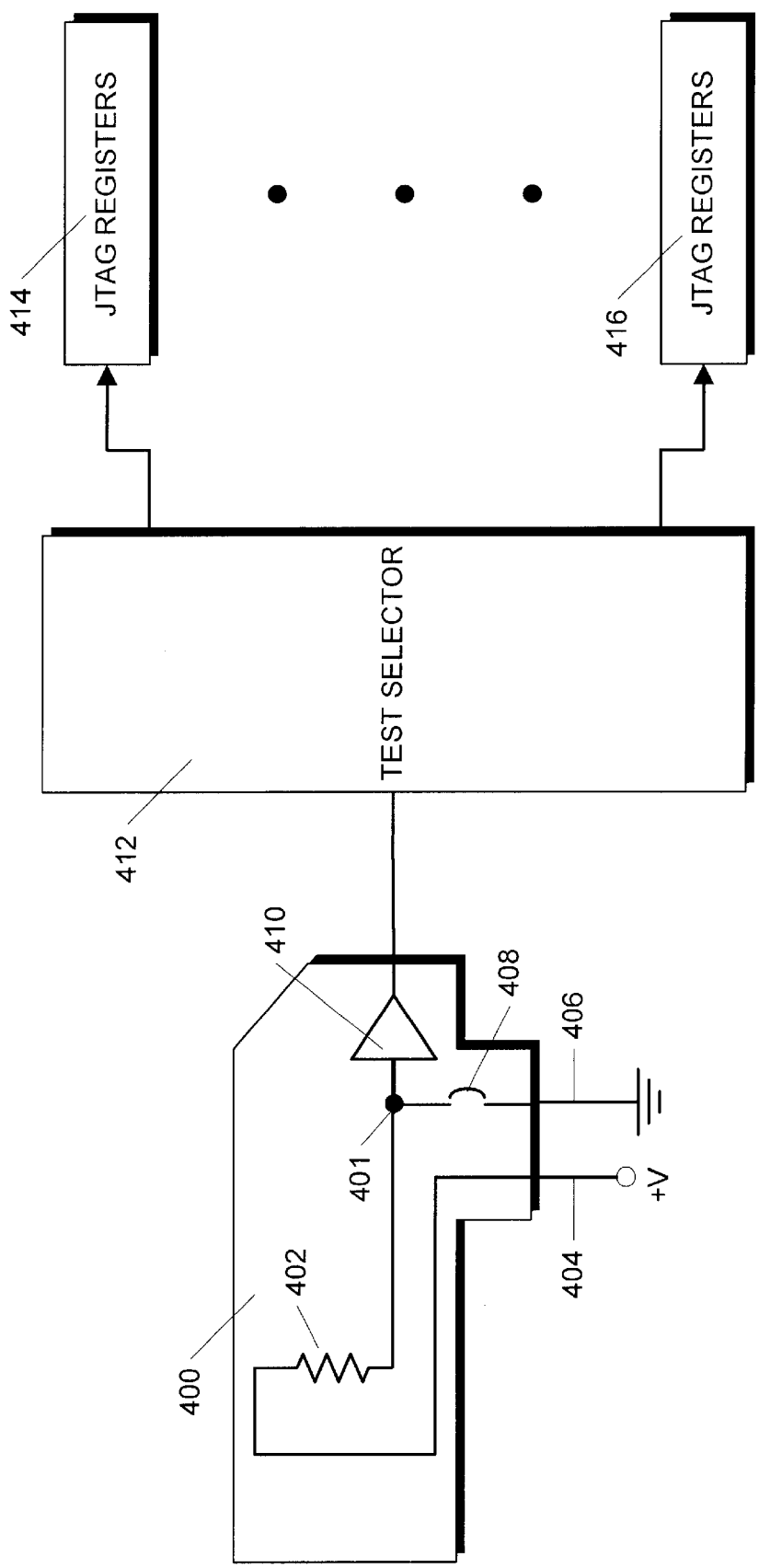
FIG. 4 is a block schematic diagram illustrating the selection of a test sequence using a hardware "mode" pin.

There are several methods of providing a test selection variable value to select the test sequences. In a preferred embodiment, the value represented by the state of a hardware "mode" pin is used to select the test sequence. An exemplary embodiment is illustrated in FIG. 4. A portion of the hardware circuitry for an electronic system is illustrated at 400 and includes a node 401 which is normally maintained at the supply voltage by resistor 402 connected to voltage source 404. During the manufacturing process, a jumper 408 can be applied by the manufacturing test personnel to connect node 401 to ground 406. This connection could often be implemented via a pin that is tied to ground in a test fixture into which the board is plugged for either screening or diagnostics, but not both. The voltage at node 401 is supplied through a buffer 410 to a test selector 412.

Test selector 412 is located in the electronic system and controls the sequence of sub-tests run in a particular sequence. Selector 412 could consist of specialized test circuitry, but, in a preferred embodiment, test selector 412 is a software program contained in the memory of the computer which program senses the value generated by buffer 410 and selects a particular sequence in response. For example, in response to a ground voltage at its input, test selector 412 constructs a screening test sequence, either by controlling the testers which run the sub-tests, for example, by using test registers known as JTAG registers 414–416, or by selecting a software-controlled sequence which determines the sub-test sequence.

After the manufacturing screening test is complete, the jumper 408 is removed allowing resistor 402 to pull the node 401 to supply voltage. The supply voltage signal is applied, via buffer 410, through the test selector 412 that selects the diagnostic testing sequence in response. This arrangement has the advantage that it uses few system resources to select the testing sequence and, after manufacturing is complete, the testing system will remain in the diagnostic mode.

Figure 5:
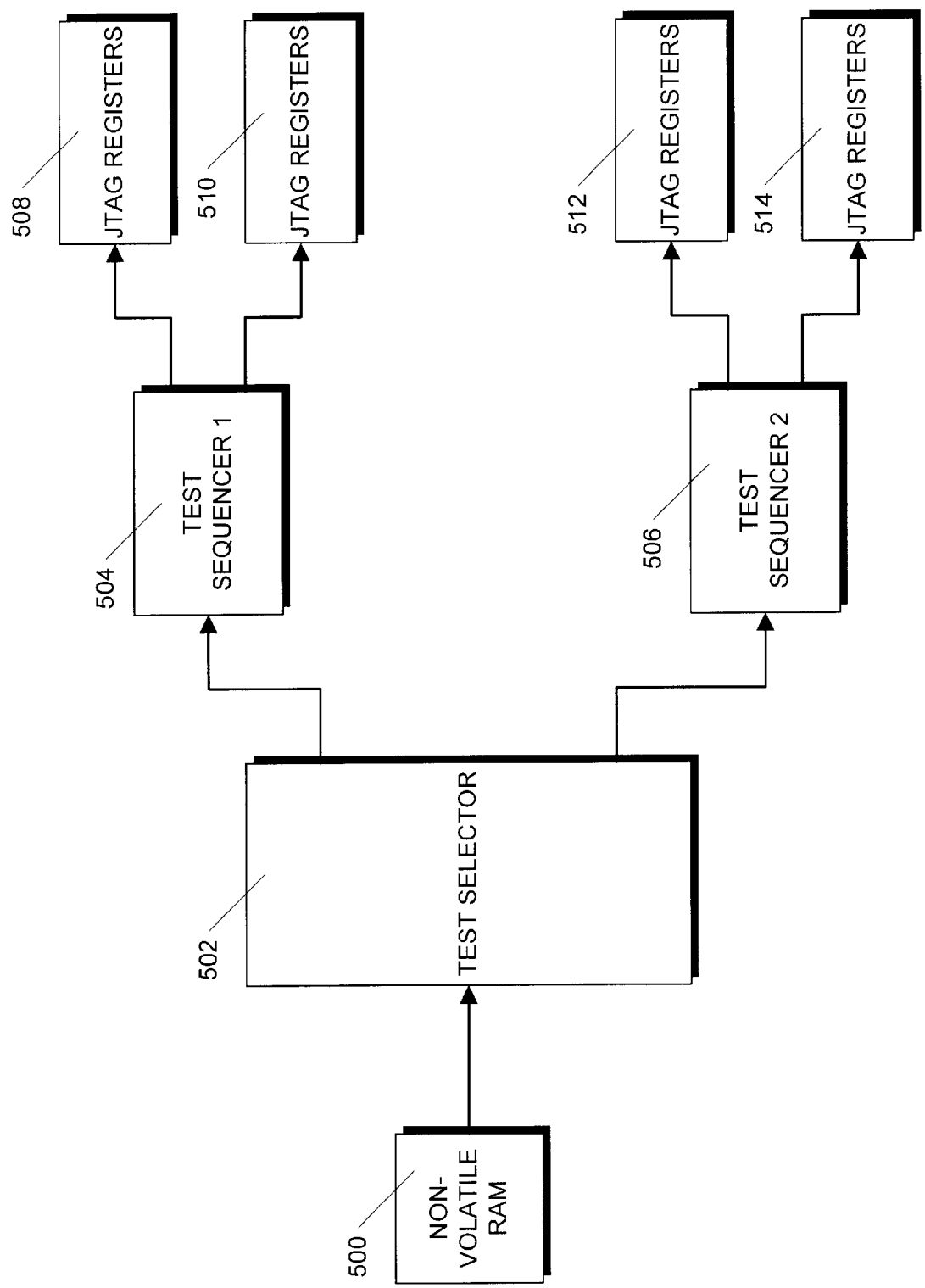
FIG. 5 is a block schematic diagram illustrating the selection of a test sequence using a value stored in a memory location.

An alternative mechanism for selecting a test sequence is illustrated in FIG. 5. In FIG. 5, a test selection value stored in a non-volatile ram location 500 is used to control test selector 502 which might consist of hardware or software located in the electronic system. Test selector 502, in turn, selects one of test sequencers 504 or 506. Each test sequencer generates a fixed test sequence by means of JTAG registers 508–510, or, in the case of test sequencer 506, JTAG registers 512–514. Alter natively, the test sequencers may be software programs stored in a memory in the electronic system. Other suitable arrangements for selecting the variable test sequence would be apparent to those skilled in the art.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium either can be a tangible medium, including, but not limited to, Sit optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate.that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system, other hardware and software could be used in the same manner as that described. In addition, although only two test sequences have been described, more than two sequences could be used to generate other tests used to test aspects of the electronic system other than screening and diagnostics. Other aspects, such as the specific instructions utilized to achieve a particular function, as well as other modifications to the inventive concept are intended to be covered by the appended claims.

What is claimed is:

1. An apparatus for optimizing testing sequences of electronic equipment comprising:
   a plurality of testers, each of which performs a predetermined sub-test on the electronic equipment;
   a test selector which responds to a value of a test selection variable by controlling the plurality of testers to perform sub-tests on the electronic equipment in a first predetermined order that is optimized for performing testing for a first purpose and to perform the sub-tests in a second predetermined order that is different from the first predetermined order and optimized for performing testing for a second purpose different from the first purpose; and
   a mechanism for generating a test selection variable value at different times during the operation of the electronic equipment.

2. The apparatus according to claim 1 wherein the first predetermined order is optimized for performing screening.

3. The apparatus according to claim 1 wherein the second predetermined order is optimized for performing diagnostic testing.

4. The apparatus according to claim 1 wherein the test selection variable value generating mechanism comprises an electrical value on a hardware pin.

5. The apparatus according to claim 1 wherein the test selection variable value generating mechanism comprises a value stored in a memory.

6. The apparatus according to claim 1 wherein at least one of the testers comprises a software program for testing the electronic equipment.

7. The apparatus according to claim 1 wherein at least one of the testers comprises a hardware circuit for testing the electronic equipment.

8. The apparatus according to claim 1 wherein the test selector comprises a programmable sequencer which responds to a value of a test selection variable by generating a plurality of test sequences.

9. The apparatus according to claim 1 wherein the test selector comprises a plurality of test sequencers and a mechanism which responds to a value of a test selection variable for selecting one test sequencer of the plurality of test sequencers.

10. A method for optimizing testing sequences of electronic equipment comprising:
    (a) constructing a plurality of testers, each of which performs a predetermined sub-test on the electronic equipment;
    (b) controlling the plurality of testers in response to a value of a test selection variable to perform sub-tests on the electronic equipment in a first predetermined order that is optimized for performing testing for a first purpose and to perform the sub-tests in a second predetermined order that is different from the first predetermined order and optimized for performing testing for a second purpose different from the first purpose; and
    (c) generating a test selection variable value at different times during the operation of the electronic equipment.

11. The method according to claim 10 wherein the first predetermined order is optimized for performing screening.

12. The method according to claim 10 wherein the second predetermined order is optimized for performing diagnostic testing.

13. The method according to claim 10 wherein step (c) comprises sensing an electrical value on a hardware pin.

14. The method according to claim 10 wherein step (c) comprises sensing a value stored in a memory.

15. The method according to claim 10 wherein step (a) comprises constructing at least one software program for testing the electronic equipment.

16. The method according to claim 10 wherein step (a) comprises constructing a hardware circuit for testing the electronic equipment.

17. The method according to claim 10 wherein step (b) comprises using a programmable sequencer which responds to a value of a test selection variable to generate a plurality of test sequences.

18. The method according to claim 10 wherein step (b) comprises using a plurality of test sequencers and a mechanism which responds to a value of a test selection variable for selecting one test sequencer of the plurality of test sequencers.

19. A computer program product for optimizing testing sequences of electronic equipment, the computer program product comprising a computer usable medium having computer readable program code thereon, including:
    program code for constructing a plurality of testers, each of which performs a predetermined sub-test on the electronic equipment;
    program code for controlling the plurality of testers in response to a value of a test selection variable to perform sub-tests on the electronic equipment in a first predetermined order that is optimized for performing testing for a first purpose and to perform the sub-tests in a second predetermined order that is different from the first predetermined order and optimized for performing testing for a second purpose different from the first purpose; and
    program code for generating a test selection variable value at different times during the operation of the electronic equipment.

20. The computer program product according to claim 19 wherein the first predetermined order is optimized for performing screening.

21. The computer program product according to claim 19 wherein the second predetermined order is optimized for performing diagnostic testing.

22. A computer data signal embodied in a carrier wave for optimizing testing sequences of electronic equipment, the computer data signal comprising:

program code for constructing a plurality of testers, each of which performs a predetermined sub-test on the electronic equipment;

program code for controlling the plurality of testers in response to the value of a test selection variable to perform sub-tests on the electronic equipment in a first predetermined order that is optimized for performing testing for a first purpose and to perform the sub-tests in a second predetermined order that is different from the first predetermined order and optimized for performing testing for a second purpose different from the first purpose; and program code for generating a test selection variable value at different times during the operation of the electronic equipment.

23. An apparatus for optimizing testing sequences of electronic equipment comprising:

a plurality of testers, each of which performs a predetermined sub-test on the electronic equipment;

a test selector which responds to a value of a test selection variable by controlling the plurality of testers to perform sub-tests on the electronic equipment in a first predetermined sequence for performing diagnostic testing and to perform tests in a substantially reverse order from the first predetermined sequence for performing screening testing; and a mechanism for generating a test selection variable value at different times during the operation of the electronic equipment.

24. The apparatus according to claim 23 wherein the test selection variable value generating mechanism comprises an electrical value on a hardware pin.

25. The apparatus according to claim 23 wherein the test selection variable value generating mechanism comprises a value stored in a memory.

26. The apparatus according to claim 23 wherein at least one of the testers comprises a software program for testing the electronic equipment.

27. The apparatus according to claim 23 wherein at least one of the testers comprises a hardware circuit for testing the electronic equipment.

28. The apparatus according to claim 23 wherein the test selector comprises a programmable sequencer which responds to a value of a test selection variable by generating a plurality of test sequences.

29. The apparatus according to claim 23 wherein the test selector comprises a plurality of test sequencers and a mechanism which responds to a value of a test selection variable for selecting one test sequencer of the plurality of test sequencers.

30. A method for optimizing testing sequences of electronic equipment comprising:

(a) constructing a plurality of testers, each of which performs a predetermined sub-test on the electronic equipment;

(b) controlling the plurality of testers in response to a value of a test selection variable to perform sub-tests on the electronic equipment in a first predetermined sequence for performing diagnostic testing and to perform the sub-tests in a substantially reverse order from the first predetermined sequence for performing screening testing; and (c) generating a test selection variable value at different times during the operation of the electronic equipment.

31. The method according to claim 30 wherein step (c) comprises sensing an electrical value on a hardware pin.

32. The method according to claim 30 wherein step (c) comprises sensing a value stored in a memory.

33. The method according to claim 30 wherein step (a) comprises constructing at least one software program for testing the electronic equipment.

34. The method according to claim 30 wherein step (a) comprises constructing a hardware circuit for testing the electronic equipment.

35. The method according to claim 30 wherein step (b) comprises using a programmable sequencer which responds to a value of a test selection variable to generate a plurality of test sequences.

36. The method according to claim 30 wherein step (b) comprises using a plurality of test sequencers and a mechanism which responds to a value of a test selection variable for selecting one test sequencer of the plurality of test sequencers.

* * * * *